United States Patent [19]
Sh

[11] Patent Number: 6,092,403
[45] Date of Patent: Jul. 25, 2000

[54] STEERING WHEEL AND LOCK ARRANGEMENT FOR A MOTOR VEHICLE

[76] Inventor: Ching-He Sh, No. 339, Chung-Hua Rd., Hualien City, Hualien Hsien, Taiwan

[21] Appl. No.: 09/260,603

[22] Filed: Mar. 2, 1999

[51] Int. Cl.[7] .................................................... B60R 25/02
[52] U.S. Cl. ................................ 70/209; 70/225; 70/226; 74/484 R; 74/552
[58] Field of Search .................................. 74/484 R, 558, 74/558.5, 552, 555; 70/209, 226, 225, 207, 158, 159, 160

[56] References Cited

U.S. PATENT DOCUMENTS 5,442,942  8/1995  Geisler ........................................ 70/209

*Primary Examiner*—Charles A Marmor
*Assistant Examiner*—Tisha D. Waddell
*Attorney, Agent, or Firm*—Birch, Stewart, Kolasch & Birch, LLP

[57] ABSTRACT

A steering wheel and lock arrangement, which includes a steering wheel and a lock, the steering wheel being formed of an upper wheel half and a lower wheel half, the lower wheel half having a first oblong insertion hole and two second oblong insertion holes at a top side wall thereof and a respective coupling chamber respectively defined inside each oblong insertion hole, the upper wheel half having a downward rod with a transverse block pivotably coupled to the coupling chamber in the first oblong insertion hole, the lock being securely mounted in the upper wheel half and moved with the upper wheel half between the two second oblong insertion holes at the lower wheel half and operated to lock the steering wheel between the operative position and the non-operative position.

1 Claim, 9 Drawing Sheets

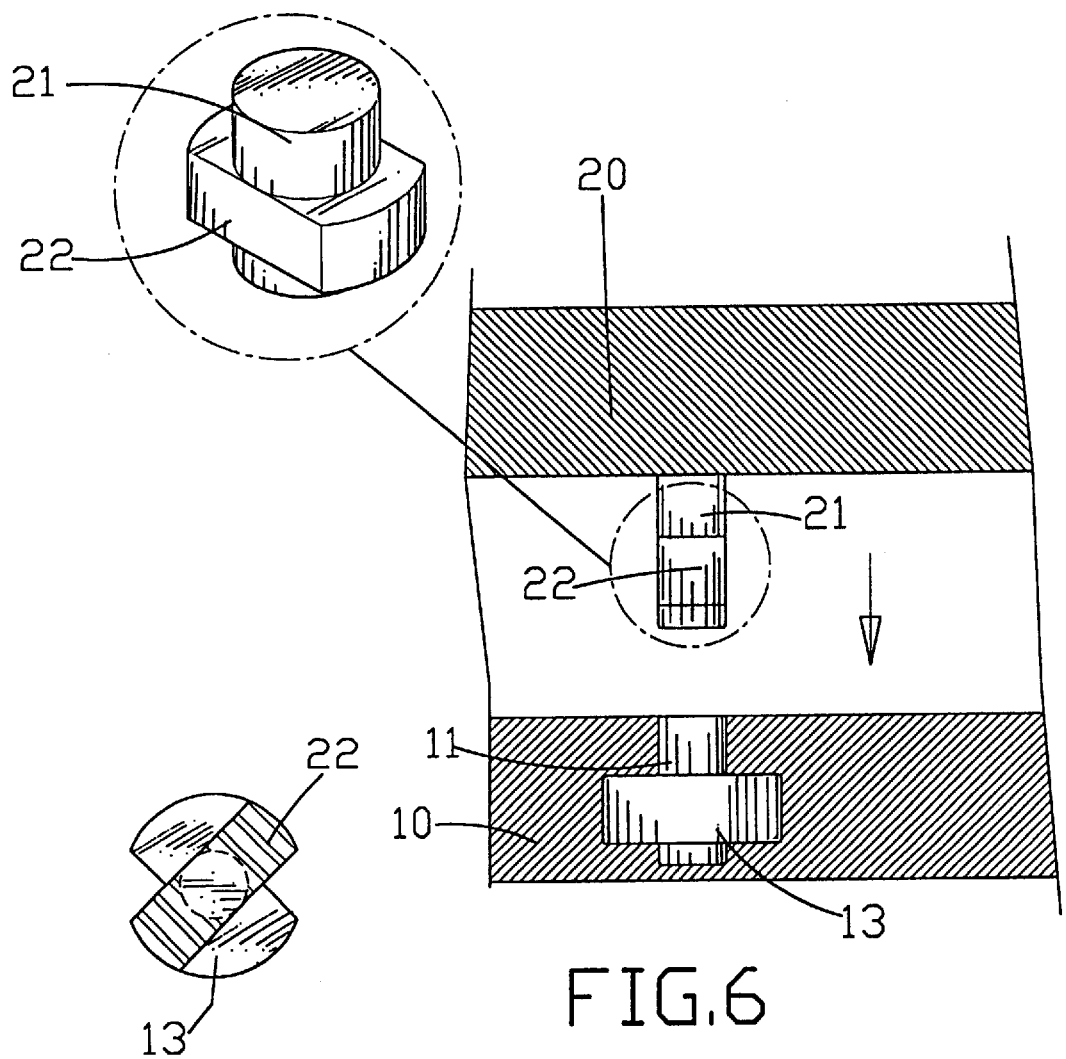
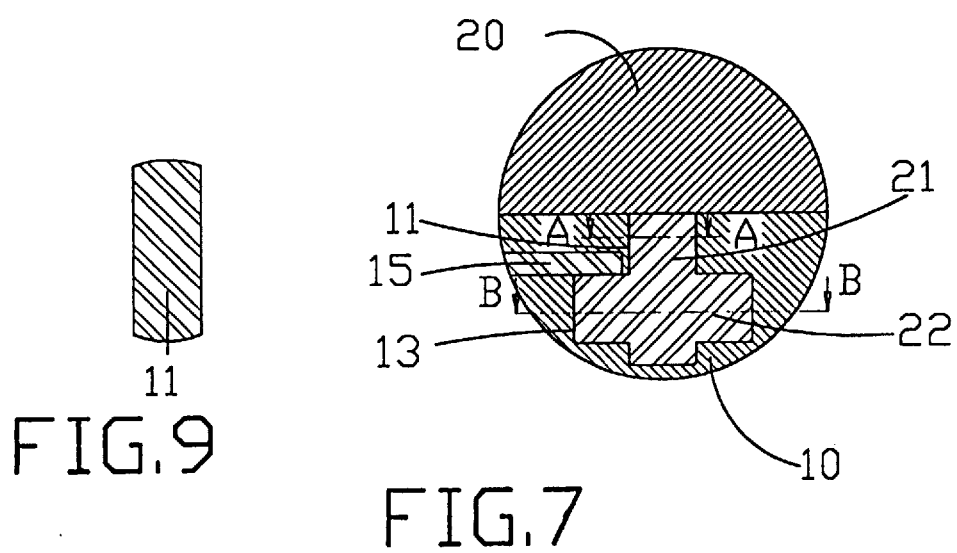

STEERING WHEEL AND LOCK ARRANGEMENT FOR A MOTOR VEHICLE

BACKGROUND OF THE INVENTION

The present invention relates to a steering wheel and lock arrangement in which the steering wheel is comprised of a fixed lower wheel half and a movable upper wheel half pivoted to the fixed lower wheel half, and a lock is installed in the movable upper wheel half and operated to lock the movable upper wheel half wheel between the operative position and the non-operative position.

A motor vehicle owner may use a steering wheel lock or a steering column lock to lock the steering wheel or steering column of the motor vehicle when the motor vehicle is parked. These lock devices need much installation space. Further, the installation procedure of these lock devices is complicated.

SUMMARY OF THE INVENTION

It is one object of the present invention to provide a steering wheel lock for a motor vehicle which does not occupy any vehicle inside space. It is another object of the present invention to provide a steering wheel lock for a motor vehicle which is incorporated in the steering wheel. It is still another object of the present invention to provide a steering wheel lock for a motor vehicle which keeps the vehicle body intact during its installation. To achieve these and other objects of the present invention, there is provided a steering wheel and lock arrangement comprised of a steering wheel and a lock, wherein the steering wheel is comprised of a fixed lower wheel half and a movable upper wheel half pivoted to the fixed lower wheel half, and the lock is securely mounted in the movable upper wheel half and operated to lock the movable upper wheel half wheel between a first position where the upper wheel half and the lower wheel half are coincided with each other, and a second position where the upper wheel half is extended out of lower wheel half to stop the steering wheel from operation.

BRIEF DESCRIPTION OF THE DRAWINGS

FIG. 6 is a sectional view in an enlarged scale of a part of the present invention, showing the relationship between the transverse block at the rod of the upper wheel half and the first coupling chamber in the first oblong insertion hole at the lower wheel half.

FIG. 7 is a sectional view in an enlarged scale of a part of the present invention, showing the transverse block at the rod of the upper wheel half engaged into the first coupling chamber in the first oblong insertion hole at the lower wheel half.

FIG. 8 is a sectional view taken along line A—A of FIG. 6.

FIG. 9 is a sectional view taken along line B—B of FIG. 6.

DETAILED DESCRIPTION OF THE PREFERRED EMBODIMENT

Figure 1:
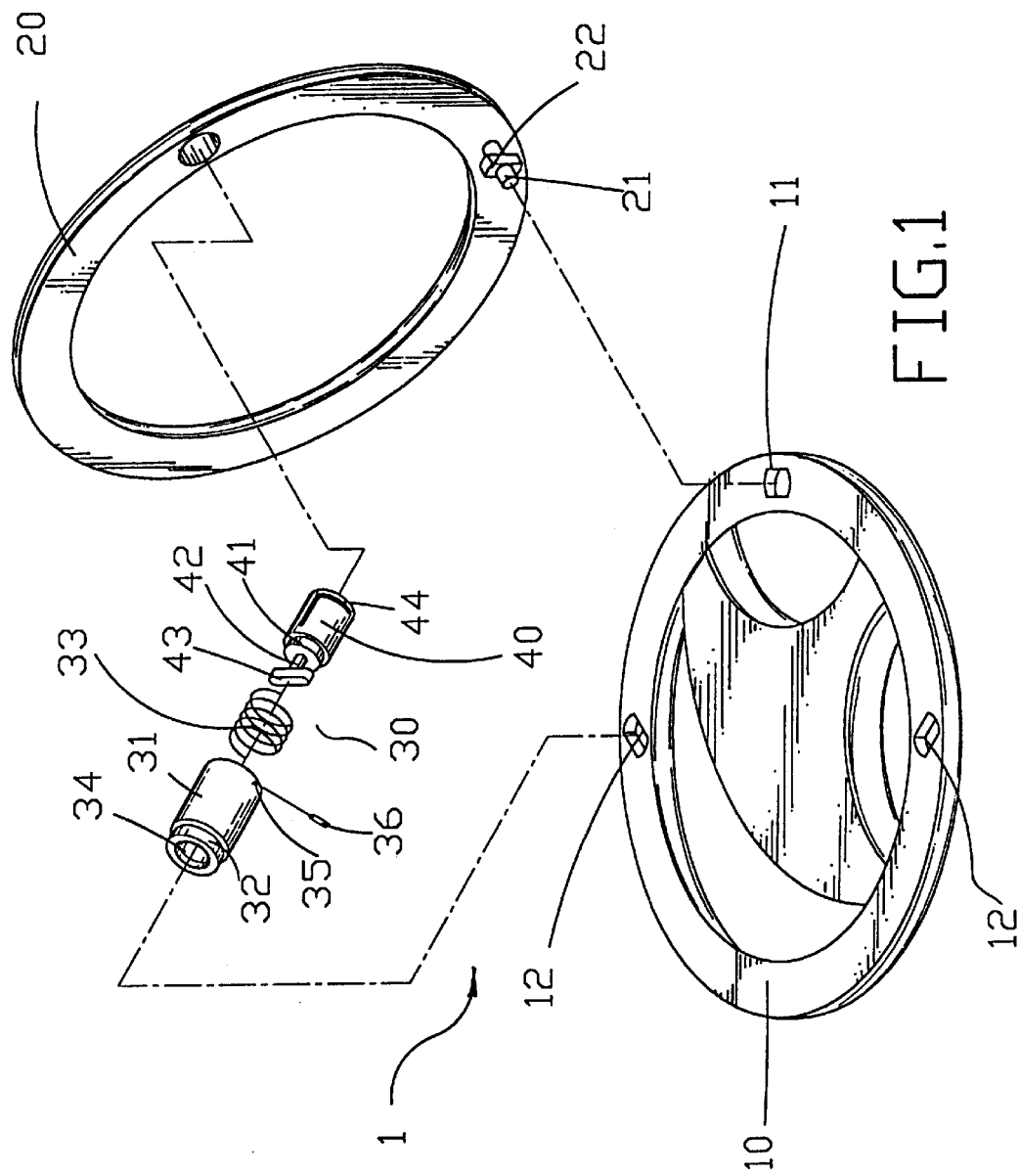
FIG. 1 is an exploded view of the present invention.
Figure 2:
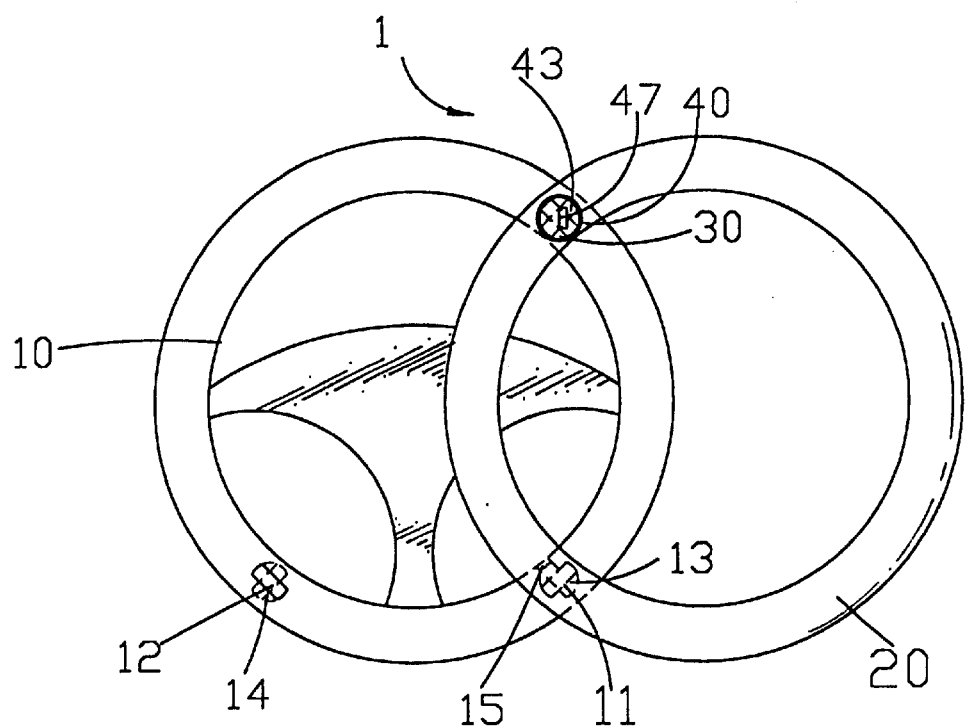
FIG. 2 is a top view showing the steering wheel locked in the non-operative position.
Figure 3:
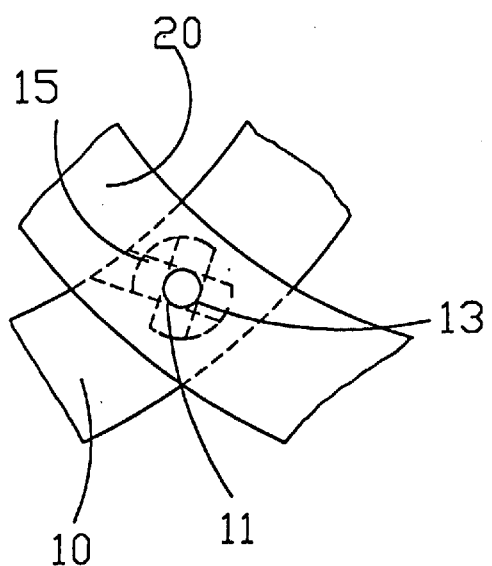
FIG. 3 is an enlarged view in an enlarged scale of a part of FIG. 2.
Figure 4:
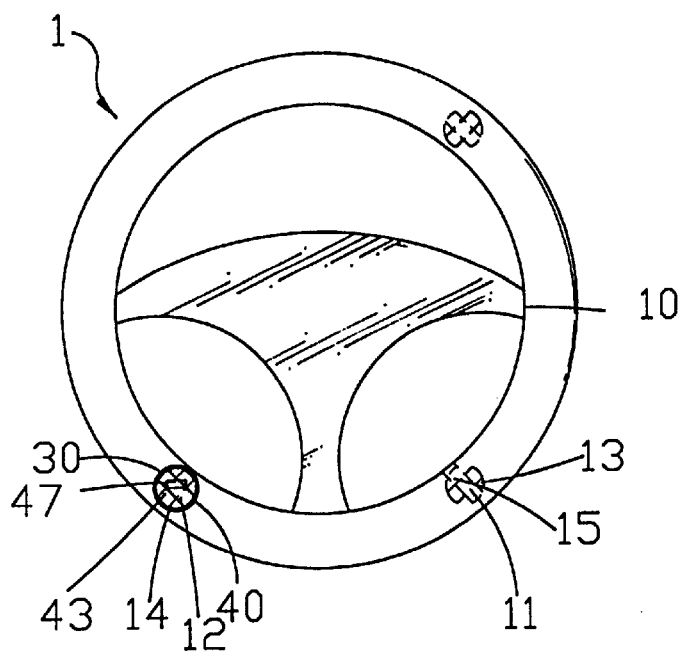
FIG. 4 is a top view showing the upper wheel half locked in the operative position.
Figure 5:
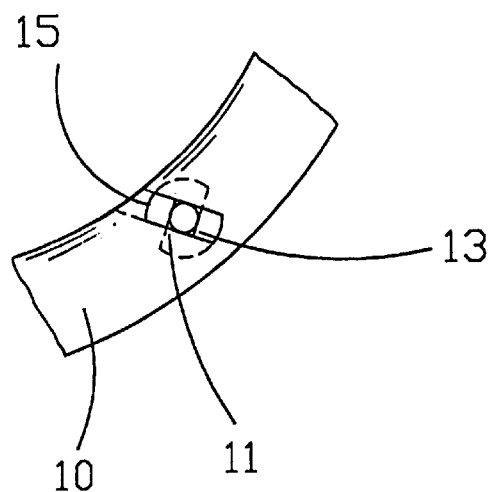
FIG. 5 is an enlarged view in an enlarged scale of a part of FIG. 4.
Figure 10:
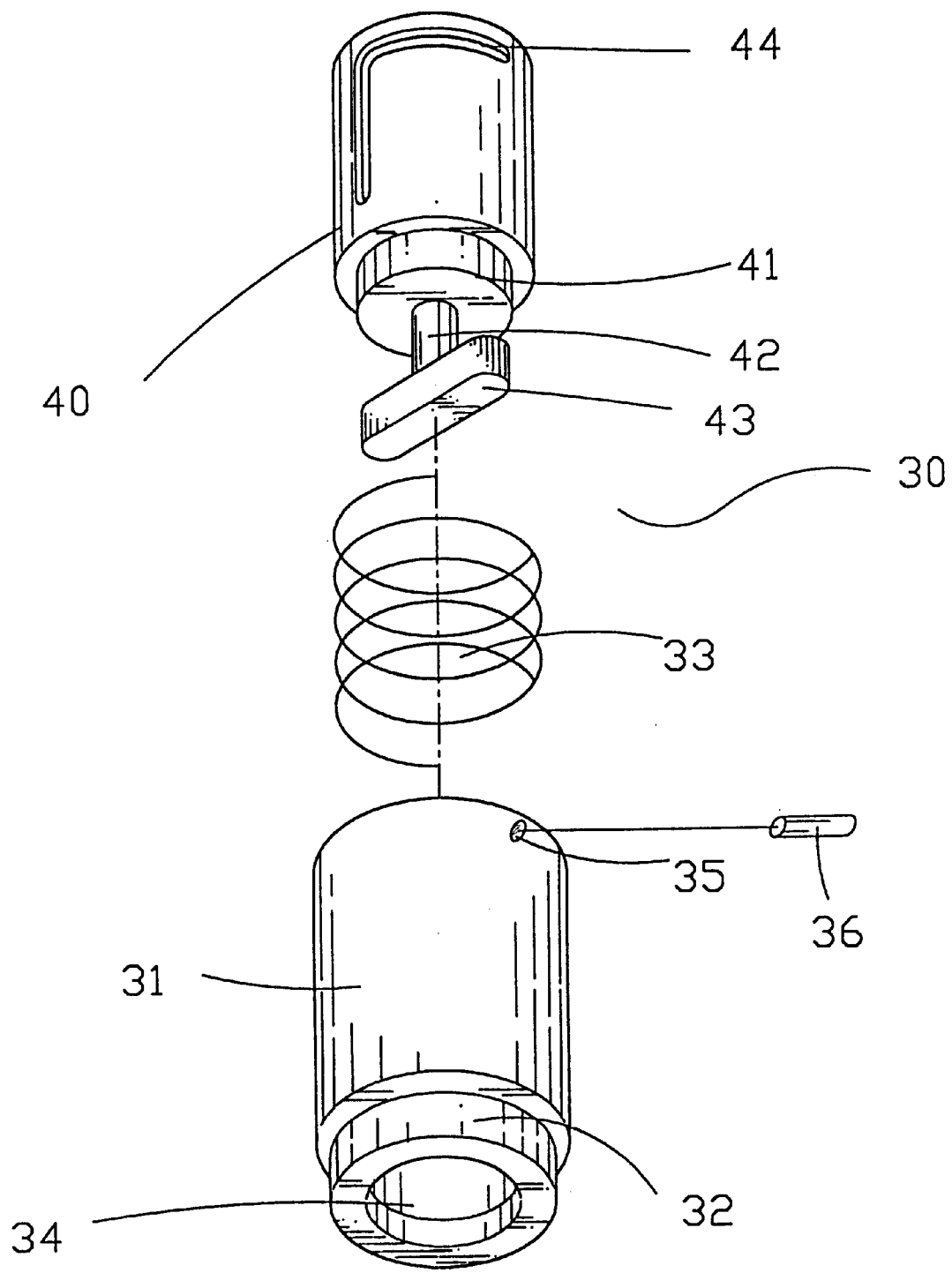
FIG. 10 is an exploded view of the lock according to the present invention.
Figure 11:
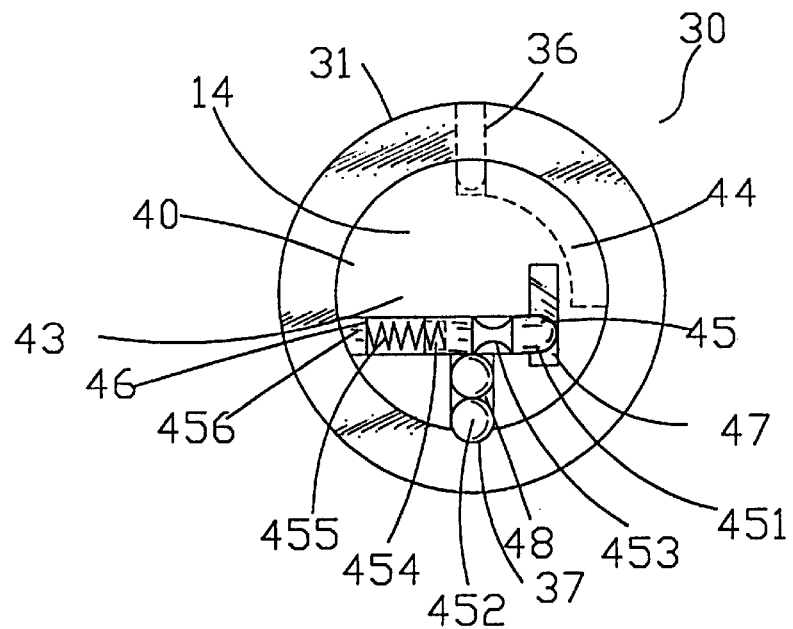
FIG. 11 is a top plain view of the lock according to the present invention.
Figure 12:
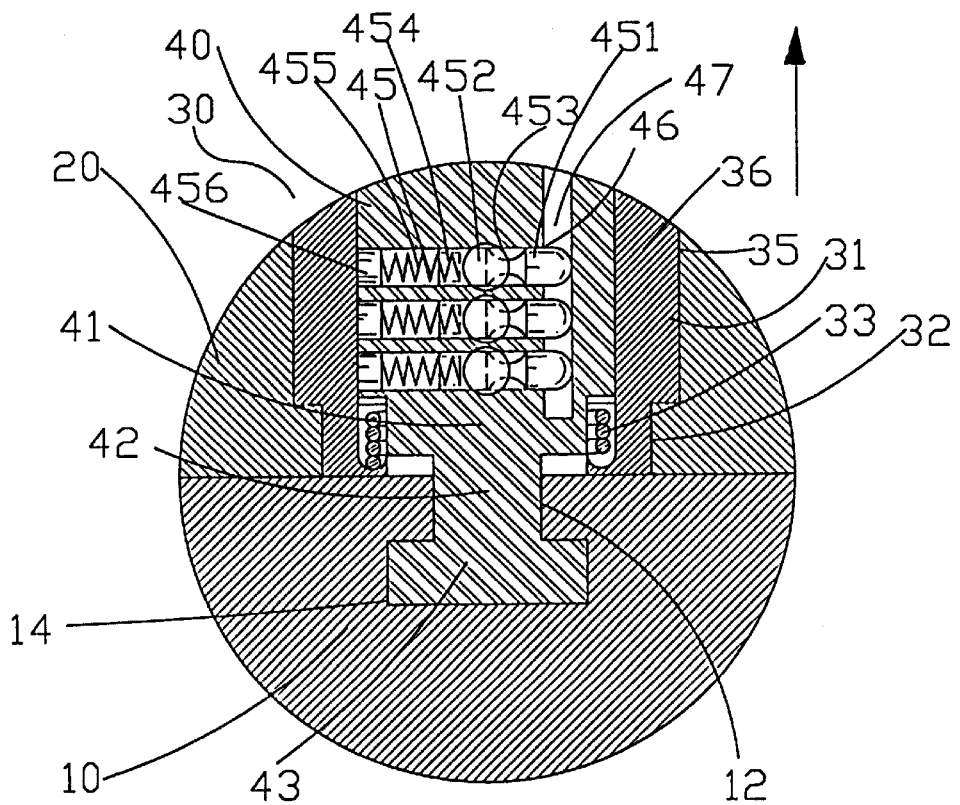
FIG. 12 is a sectional view in an enlarged scale of a part of the present invention, showing the lock locked.
Figure 13:
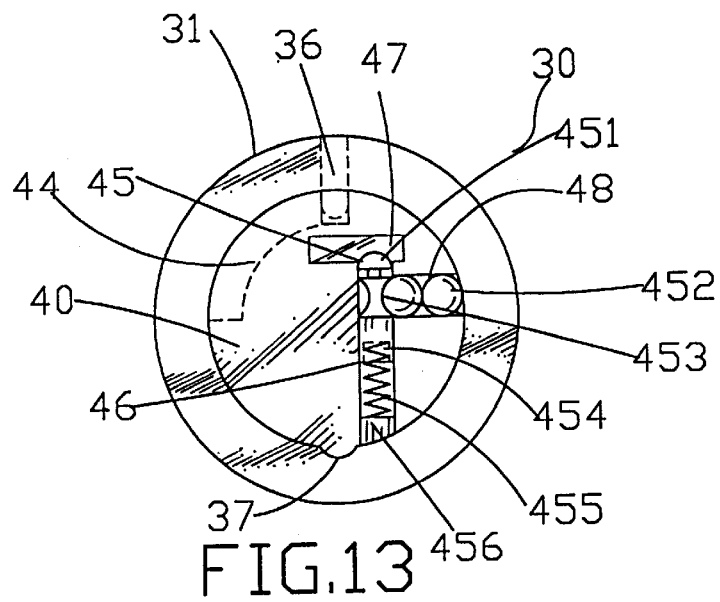
FIG. 13 is a top plain view showing the lock unlocked according to the present invention.
Figure 14:
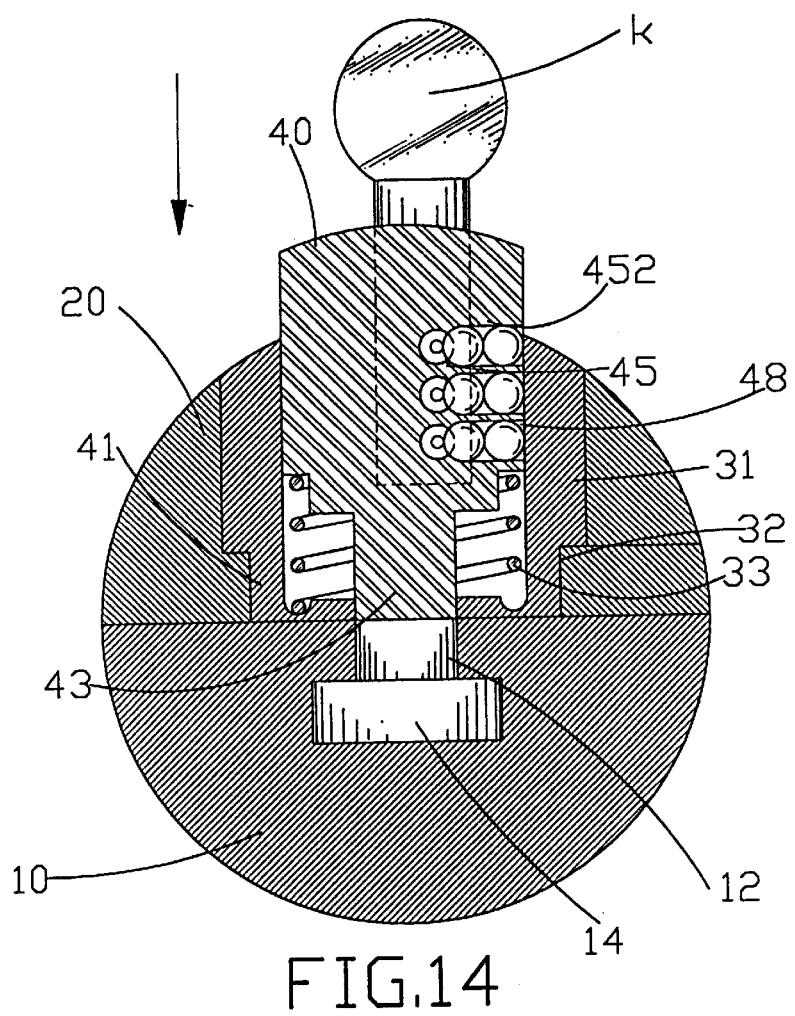
FIG. 14 is a sectional view in an enlarged scale of a part of the present invention, showing the key insertion into the plug and the lock unlocked.
Figure 15:
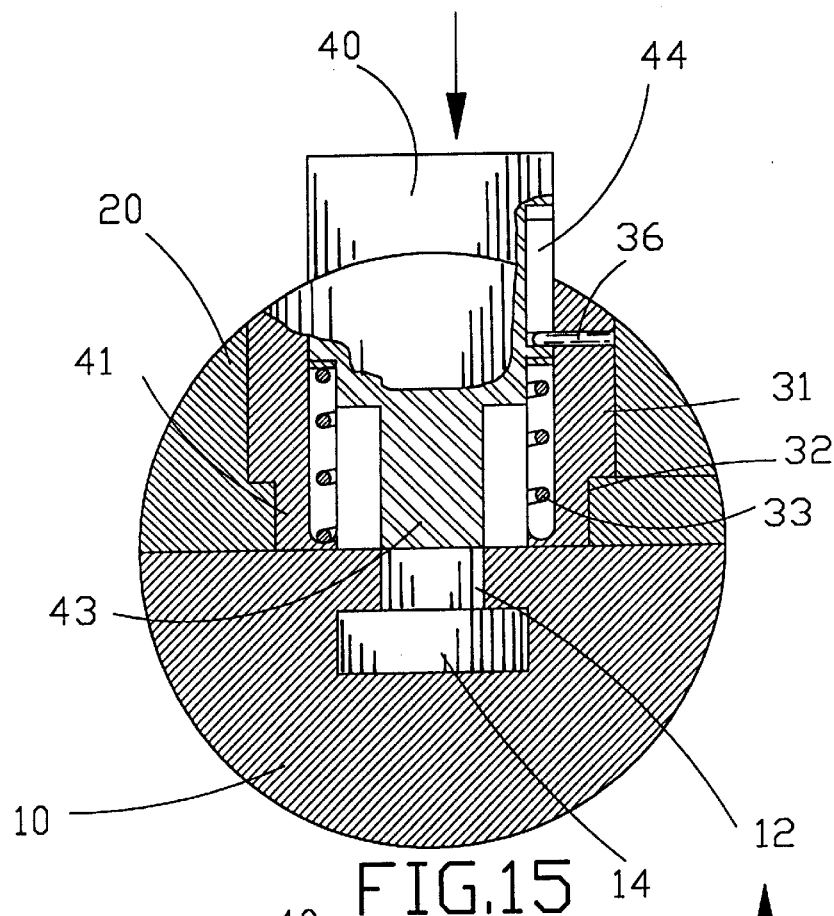
FIG. 15 is a sectional view in an enlarged scale of a part of the present invention, showing the spring of the lock released, the plug extended out of the cylinder.
Figure 16:
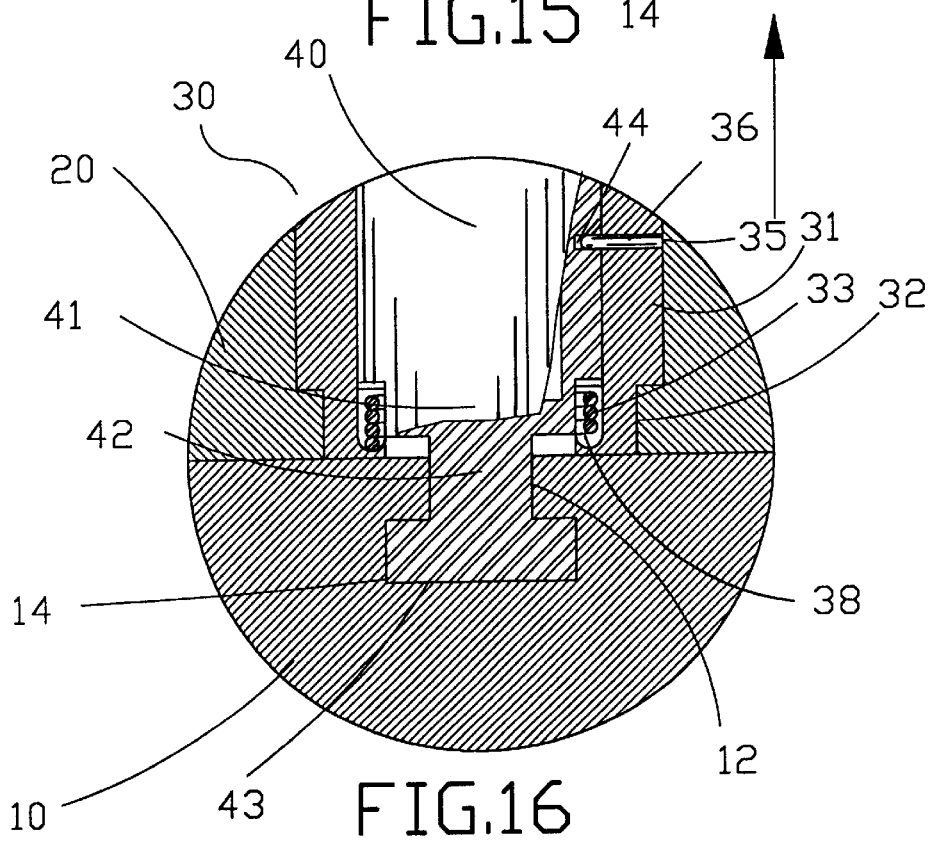
FIG. 16 is a sectional view in an enlarged scale of a part of the present invention, showing the spring of the lock compressed, the plug received in the cylinder.
Figure 17:
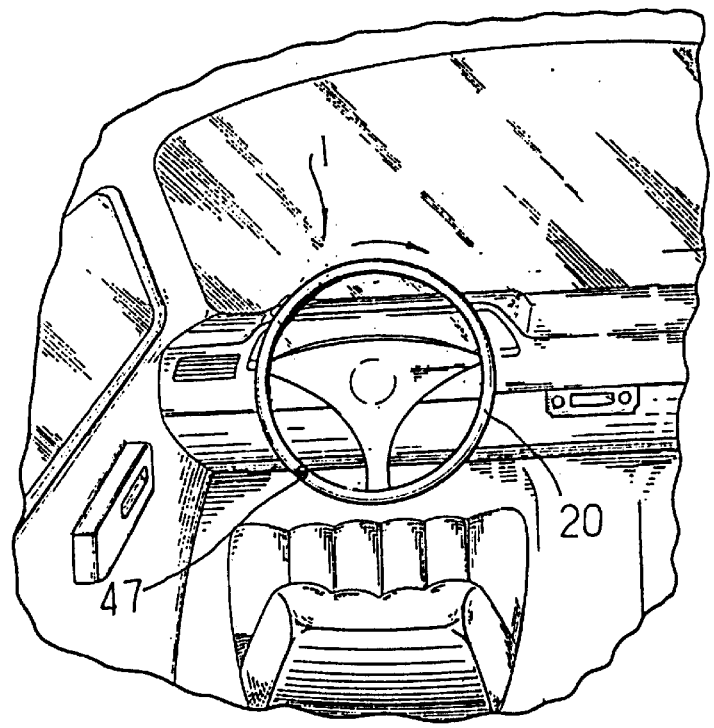
FIG. 17 is an applied view of the present invention, showing the steering wheel set in the operative position.
Figure 18:
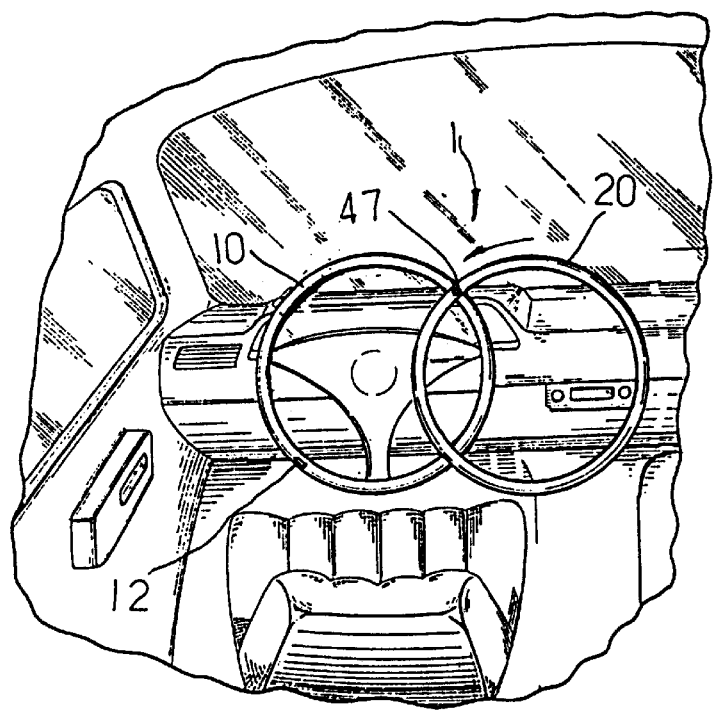
FIG. 18 is another applied view of the present invention, showing the steering wheel locked in the non-operative position.

Referring to FIGS. from 1 through 16, the steering wheel, referenced by 1, is comprised of an upper wheel half 20 and a lower wheel half 10. The lower wheel half 10 is securely mounted on the steering column of a motor vehicle (see FIGS. 17 and 18), having a first oblong insertion hole 11 and two second oblong insertion holes 12 at its top side wall, a first coupling chamber 13 disposed on the inside in communication with the first oblong insertion hole 11, and two second coupling chambers 14 disposed on the inside in communication with the second oblong insertion holes 12 respectively. The first oblong insertion hole 11 is equally spaced from the second oblong insertion holes 12. The coupling chambers 13 and 14 each are formed of two sector halves symmetrically disposed at two opposite sides. The upper wheel half 20 comprises a downward rod 21 and a transverse block 22 across the rod 21. The transverse block 22 can be inserted with the rod 21 through the first oblong insertion hole 11 into the first coupling chamber 13. After insertion of the transverse block 22 into the first coupling chamber 13, a latch 15 is installed in the lower wheel half 10 in between the first oblong insertion hole 11 and the first coupling chamber 13 to stop the transverse block 22 from being moved with the rod 21 out of the first oblong insertion hole 11 without prohibiting rotation of the rod 21 in the first oblong insertion hole 11 (see FIGS. from 1 through 9). A lock 30 is installed in the upper wheel half 20 at the bottom side, and spaced from the rod 21 at a distance equal to the pitch between the first oblong insertion hole 11 and the second oblong insertion holes 12. The lock 30 is comprised of a cylinder 31, a plug 40, and a spring 33. The cylinder 31 comprises a flange 32 axially extended from its front end, an axially extended inside receiving chamber 38, a through hole 34 axially extended through the flange 32 in communication with the inside receiving chamber 38, a radially extended pin hole 35 near its rear end (remote from the flange 32), a locating pin 36 securely mounted in the pin hole 35 and partially projecting into the inside receiving chamber 38, and an inside annular groove 37 around the inside receiving chamber 38 for receiving steel balls 452 in the plug 40. The plug 40 and the spring 33 are mounted in the inside receiving chamber 38 within the cylinder 31. The plug 40 comprises a circular flange 41 raised from its front end, a spindle 42 extended out of the circular flange 41 at the center and suspended in the through hole 34 at the cylinder 31, a locking block 43 fixedly perpendicularly connected to the spindle 42 and disposed outside the cylinder 31 for insertion into the second coupling chamber 14 in one of the second oblong insertion holes 12 at the lower wheel half 10 to lock the steering wheel 1 in the operative position shown in FIG. 4 or the non-operative position shown in FIG. 2, a substantially ⌈-shaped sliding groove 44 at its periphery into which the locating pin 36 is perpendicularly inserted to guide the motion of the plug 40 relative to the cylinder 31 for enabling the plug 40 to be rotated clockwise/counter-clockwise or moved vertically up and down, an axially extended keyway 47, a plurality of transverse through holes 46 intersected with the keyway 47, a plurality of pin tumbler units 45 respectively mounted in the transverse through holes 46, a plurality of locating holes 48 respectively perpendicularly extended from the transverse through holes 46 to the periphery, and pairs of steel balls 452 respectively received in the locating holes 48. The pin tumbler units 45 each comprise an end piece 456 securely mounted in the corresponding transverse through hole 46 at one end remote from the keyway 47, a pin 451 moved in and out of the corresponding transverse through hole 46 relative to the keyway 47, the pin 451 having an annular groove 453 around its periphery and a locating hole 454 at its rear end, and a spring 455 having its front end fastened to the locating hole 454 at the rear end of the pin 451 and its rear end fastened to the end piece 456. The spring 455 imparts a forward pressure to the pin 451, causing the pin 451 to be moved into the keyway 47. When the lock 30 is unlocked with the key K, the steel balls 452 are respectively engaged into the annular grooves 453 at the pins 451, enabling the plug 40 to be pushed upwards by the spring 33 (see FIGS. from 13 through 15). When the key K is removed from the keyway 47, the steel balls 452 are engaged into the inside receiving chamber 38 in the cylinder 31 to stop the plug 40 from rotary motion (see FIGS. 11 and 12). The spring 33 is mounted inside the cylinder 31 around the flange 41. When the key K is inserted into the keyway 47 and operated to rotate the spindle 42 counter-clockwise through 90° angle, the locating pin 36 is moved to the left in the ⌈-shaped sliding groove 44, enabling the plug 40 to be pushed upwards by the spring 33 to disengage the locating block 43 from the corresponding second coupling chamber 14 and the corresponding second oblong insertion hole 12. When the locating block 43 is disengaged from the corresponding second coupling chamber 14 and the corresponding second oblong insertion hole 12, the downward rod 21 is turned with the upper wheel half 20 in the first coupling chamber 13, enabling the lock 30 to be moved with the upper wheel half 20 from one second oblong insertion hole 12 to the other and operated to lock the steering wheel 1 in the operative position (see FIGS. 4 and 17) or the non-operative position (see FIGS. 2 and 18).

What is claimed is:

1. A steering wheel and lock arrangement comprising:

a steering wheel, said steering wheel comprised of an upper wheel half and a lower wheel half securely mounted on the steering column of a motor vehicle, said lower wheel half comprising a first oblong insertion hole and two second oblong insertion holes at a top side wall thereof, a first coupling chamber disposed on the inside in communication with said first oblong insertion hole, and two second coupling chambers disposed on the inside in communication with said second oblong insertion holes respectively, said first oblong insertion hole being equally spaced from said second oblong insertion holes, said first coupling chamber and said second coupling chambers each formed of two sector halves symmetrically disposed at two opposite sides, said upper wheel half comprising a downward rod and a transverse block across said downward rod, the transverse block being inserted with said downward rod through said first oblong insertion hole into said first coupling chamber and retained inside said first coupling chamber by a latch for enabling said downward rod to be rotated in said first coupling chamber with said upper wheel half between a first position where said upper wheel half and said lower wheel half are coincided with each other, and a second position where said upper wheel half is extended out of said lower wheel half;

a lock installed in said upper wheel half at a bottom side, and operated to lock said upper wheel half between said first position and said second position, said lock comprised of a cylinder, a compression spring mounted in said cylinder, and a plug mounted in said cylinder and supported on said compression spring, said cylinder comprising a flange axially extended from a front end thereof, an axially extended inside receiving chamber, a through hole axially extended through the flange at said cylinder in communication with said inside receiving chamber, a radially extended pin hole near a rear end thereof, a locating pin securely mounted in said pin hole and partially projecting into said inside receiving chamber, and an inside annular groove around said inside receiving chamber, said plug comprising a circular flange raised from a front end thereof, a spindle extended out of the circular flange of said plug and suspended in the through hole at said cylinder, a locking block fixedly perpendicularly connected to said spindle and moved with said spindle in and out of said cylinder for insertion into the second coupling chamber in one of the second oblong insertion holes at said lower wheel half to lock said steering wheel between said first position and said second position, a substantially ⌈-shaped sliding groove at the periphery thereof into which said locating pin is perpendicularly inserted to guide the motion of said plug relative to said cylinder for enabling said plug to be rotated clockwise/counter-clockwise or moved vertically up and down, an axially extended keyway, a plurality of transverse through holes intersected with said keyway, a plurality of pin tumbler units respectively mounted in said transverse through holes, a plurality of locating holes respectively perpendicularly extended from said transverse through holes to the periphery of said plug, and pairs of steel balls respectively received in said locating holes, said pin tumbler units each comprising an end piece securely mounted in the corresponding transverse through hole at one end remote from said keyway, a tumbler pin moved in and out of the corresponding transverse through hole relative to said keyway, said tumbler pin having an annular groove around the periphery thereof and a locating hole at a rear end thereof, and a spring having one end fastened to the locating hole at the rear end of said tumbler pin and an opposite end fastened to said end piece;

wherein when said lock is unlocked with the key, said steel balls are respectively engaged into the annular grooves at the tumbler pins of said tumbler pin units, and said plug is pushed upwards by the compression spring of said lock, for enabling said upper wheel half to be moved relative to said lower wheel half between said first position and said second position.

* * * * *